Figure 1:
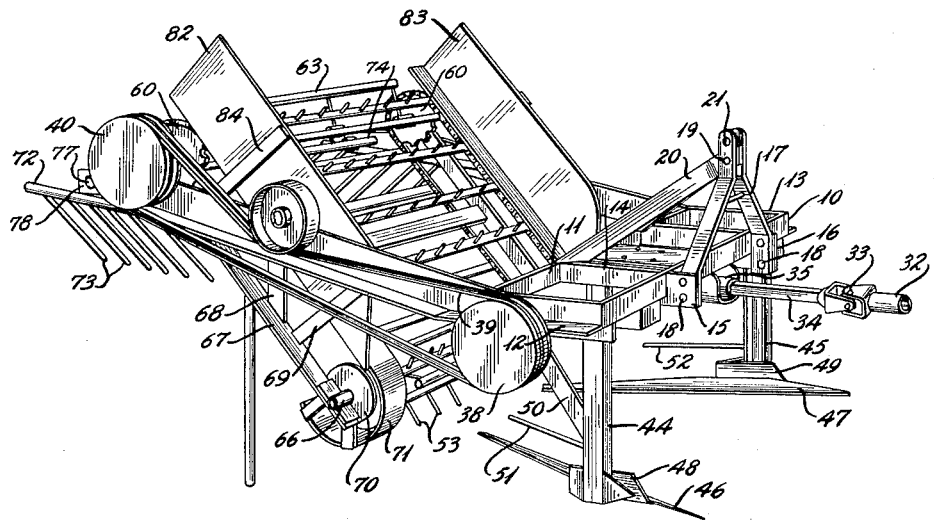

Sept. 12, 1961 W. R. LONG 2,999,547
PEANUT DIGGER AND SHAKER
Filed Jan. 21, 1960 2 Sheets-Sheet 1

INVENTOR
William R. Long

BY
ATTORNEY

Sept. 12, 1961 W. R. LONG 2,999,547
PEANUT DIGGER AND SHAKER
Filed Jan. 21, 1960 2 Sheets-Sheet 2

INVENTOR
William R. Long
BY
Ayates Dowell
ATTORNEY

United States Patent Office 2,999,547
Patented Sept. 12, 1961

2,999,547
PEANUT DIGGER AND SHAKER
William Redden Long, Tarboro, N.C., assignor to Long Manufacturing Company, Tarboro, N.C.
Filed Jan. 21, 1960, Ser. No. 3,954
9 Claims. (Cl. 171—101)

This invention relates to the harvesting and subsequent treatment of crops including the preparation of the harvested products for the market, and to the equipment employed in the performance of the various operations in connection therewith.

The invention relates particularly to the harvesting of peanuts or other leguminous products which have vines at least part of which extend above the surface of the earth and with fruit attached to the vines located beneath the surface of the earth, and in the harvesting of which ordinarily the fruit is uncovered by a plow and the vines with the fruit attached are collected and subjected to a shaking operation to free the fruit as far as possible from adhering earth after which the vines with the fruit attached are passed to an additional machine for removal of the peanuts from the vines.

In the harvesting of peanuts including uncovering them in the row with a plow prior to collecting the vines with the peanuts thereon which subsequently are detached, one of the problems is to free the peanuts from the earth and to leave behind as much as possible of the earth in which they are grown which tends to cling to them whereby the vines with the peanuts attached will be relatively free from dust and dirt which is harmful to the operator and to the machinery used in separating the peanuts from the vines.

It is an object of the invention to provide a machine which will sever the tap root and dig or uncover the peanuts, give them an additional shaking, and deposit them in a row ready to be collected and placed upon a stake for exposure to air and sunlight so that they may dry.

Another object of the invention is to provide a combination peanut digger and shaker which is relatively simple and inexpensive and which includes plow blades for severing the tap root and uncovering the peanuts of two parallel rows and for picking up the vines and carrying them over an endless conveyor and between guides so that they may be discharged between adjacent rows for subsequent collection.

A further object of the invention is to provide additional means for shaking the vines to remove any clinging dirt which means includes strikers or vine hammers for imparting a sudden jarring motion to the vines during the period of time in which they are elevated from the ground and discharged in a narrow strip between adjacent rows.

A further object of the invention is to provide a peanut digger and shaker mounted behind a tractor by a three point hitch, and which digger and shaker includes a gear box adaptable to different makes of tractors with an endless conveyor and a double V-belt drive and with angular plows to cover 28" to 40" spacing of the rows and all of which mechanism is mounted on a heavy duty angle iron frame and with iron rod vine deflectors as well as shaker pickup mechanism by which the angularity of the conveyor can be varied.

Figure 2:
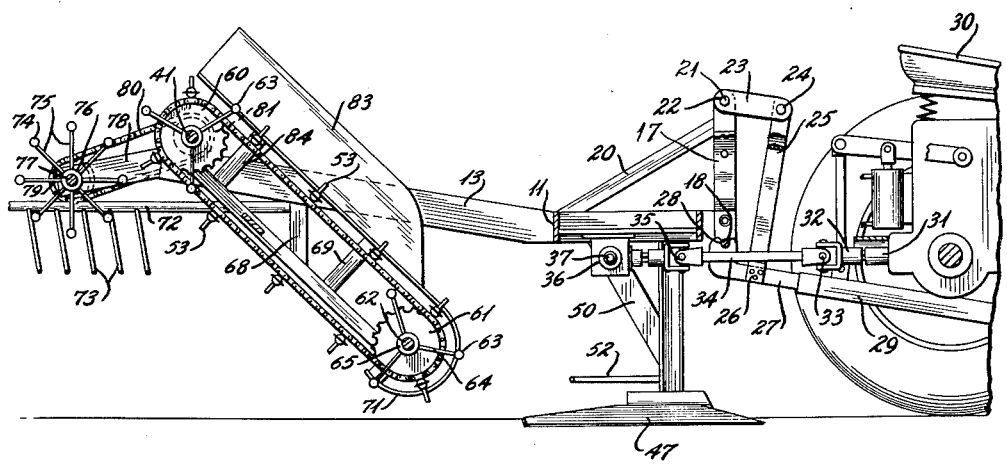
Figure 3:
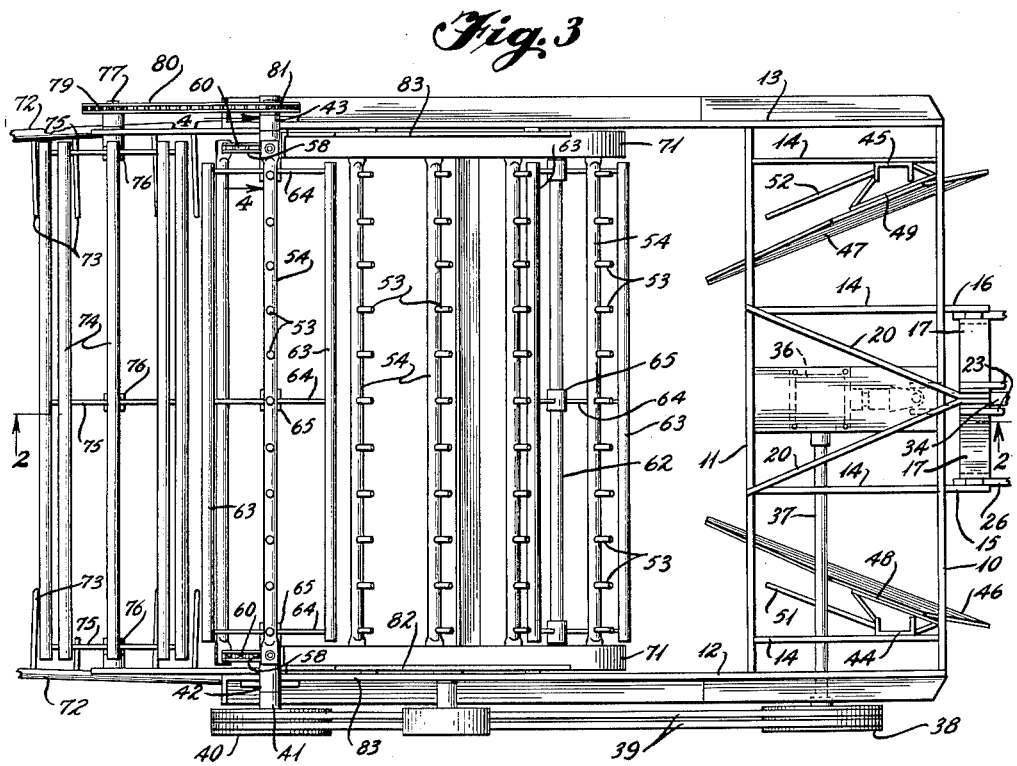
Figure 4:
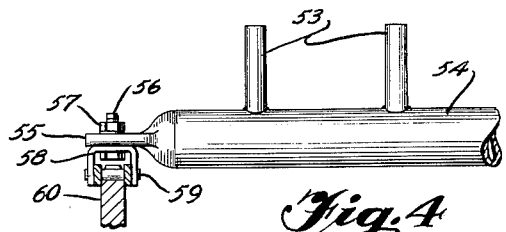
Figure 5:
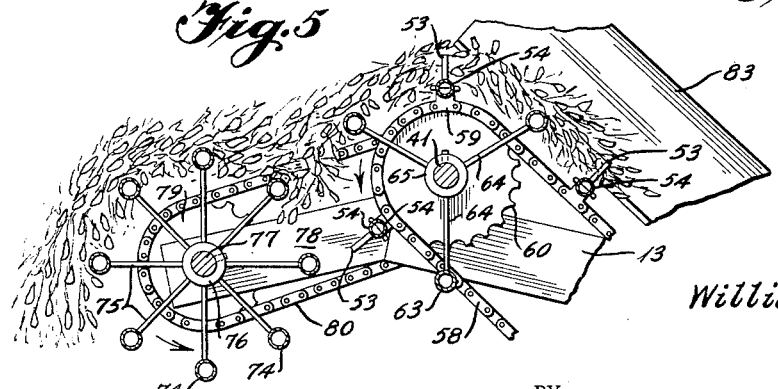

Other objects and advantages of the invention will be apparent from the following description taken in conjunction with the accompanying drawings wherein:

FIG. 1 is a perspective illustrating one application of the invention;

FIG. 2, a sectional view taken on the line 2—2 of FIG. 3 with tractor added;

FIG. 3, a top plan view;

FIG. 4, an enlarged fragmentary detail of a segment of the generally cylindrical pickup mechanism taken on line 4—4 of FIG. 3; and FIG. 5, an enlarged fragmentary view of the discharge end showing the vines with the fruit attached being discharged therefrom.

Briefly stated, the invention is a peanut digger and shaker with a pair of narrow plow blades which sever the tap roots of the peanut vines after which the vines with the peanuts attached are engaged by the spaced prongs or tines in an endless conveyor mounted at a slight incline so that the peanuts will be carried upwardly and discharged at the rear thereof where they will be guided and directed by inwardly and downwardly inclined prongs or guides of adjustable vine deflectors to cause the vines and the attached peanuts to be deposited along a narrow strip between adjacent rows in which the peanuts were grown and with a series of transverse bars caused to extend outwardly through spaces in the conveyor and to strike with a sharp or hammering blow the vines which pass thereover.

With continued reference to the drawings, a frame is provided composed of a pair of transverse front and rear frame bars 10 and 11 with connecting side angles 12 and 13 and intermediate reinforcing bars 14. On the forward side of the frame are a pair of lugs 15 and 16 attached to the lower ends of a pair of the bars 14 providing a substantially inverted V-shaped frame 17. The lower ends of such frame are secured by rivets 18 to the lugs 15 and 16 and the upper end of such bars are spaced apart and are secured by a bolt 19 which fastens the upper end of the base which extends through the upper ends of diagonal braces 20. The lower ends of the braces 20 are welded or otherwise secured to the rear member 11 and the braces 14 of the frame. The upper ends of the bars which form the inverted V-shaped frame 17 are provided with an opening 21 therethrough.

In providing the three point hitch a bolt 22 is placed in the opening 21 and through links 23 secured by a pivot 24 to a pair of diverging arms 25 riveted or secured by other fastening means 26 to a pair of draw bars 27 the rear bifurcated ends of which engage the bolts 18 and the lugs 15 and 16. The draw bar 27 is attached to a hydraulic lift 29 of a tractor 30 having a power takeoff 31 to which is connected a shaft 32 and by means of a universal joint 33, a shaft 34, and a second universal joint 35 to a gear box 36 as also shown in FIG. 3. From the gear box 36 is driven a shaft 37 and a multiple groove pulley 38 about which a series of V-belts 39 engage and drive a multiple groove pulley 40 on a shaft 41 mounted in bearings 42 and 43 in the rear end portions of angle members 12 and 13.

Beneath the upper front frame depend post-forming channels 44 and 45, the upper ends of which are bolted or otherwise secured to the frame and on the lower ends of which plow blades 46 and 47 are attached by means of brackets 48 and 49. The post forming channels 44 are provided with additional reinforcing struts 50 one at each side of the device and the upper ends of which are attached to the angles 12 and 13. The blades 46 and 47 are disposed in spaced relation from 28" to 40" apart according to the spacing of the rows over which the device operates and when the machine is operated the blades 46 and 47 sever the tap root below the surface of the earth whereupon the peanuts and the vines are raised above the soil and guided by arms 51 and 52 in a narrow strip between the two rows.

The vines with the peanuts attached are picked up by tines or prongs 53 attached to a tubular bar 54 having a flattening extremity 55 at each end through which a threaded bolt 56 extends and receives a nut 57 thus securing the tubular member 54 by an attaching link 58 forming a part of a chain including a bolt 59 which engages a sprocket 60 at each end of the tubular member 54. The lower end of the chain extends around an idler sprocket 61 mounted on a shaft 62. The chain 58 with its series of equally spaced tubular members 54 is mounted so that its tines or prongs 53 will pass close to the earth and under the peanut vines with the peanuts attached and carry them upwardly along the surface of the conveyor with most of the dirt left behind or jarred loose. In order to insure full dirt removal and to detach any of the soil that may still cling to the vines or peanuts a series of strikers are provided in the form of cross bars 63 supported at their ends and centrally by rods or spokes 64 mounted in a collar 65 fixed to shaft 62 at the lower end of the conveyor and to the shaft 41 at the upper end of the conveyor, three of such hammer or striker bars 63 being provided on each of the shafts 62 and 41 and spaced 120 degrees apart or in a manner to pass between the tubular prong or tine supporting members 54.

In certain areas the additional striking or shaking mechanism at the lower end of the conveyor will be all that is necessary while in other areas the striker shaker mechanism may only be necessary at the upper end of the conveyor.

The shaft 62 has its ends mounted in bearings 66 on a tie bar 67 reinforced by braces 68 and 69 which connect to the angle members 12 and 13. A disk type plate or shield 70 is provided at each side of the machine for restricting the lateral movement of the vines and a plate 71 is also provided at each side of the machine for controlling the spread of the vines as they are carried in the machine and for protection of the bearings and sprocket 61. The vines are turned inwardly between guides 51 and 52 and additional guides 72 having prongs 73 are located at each side of the rear of the machine for depositing the vines centrally between the rows in which the peanuts grew.

Where the soil is particularly gummy or heavy, additional shaker means may be provided in the form of a series of bars 74 mounted on spokes or arms 75 on hubs 76 fixed to shafts 77 each mounted in a pair of rearwardly extending arms or brackets 78 fastened at their forward ends to the angle sides 12 and 13.

In view of the spacing of the bars 74 they will produce a jolting or hammering action against the vines discharged from the machine. The auxiliary shaking mechanism is driven by a sprocket 79 on the shaft 77 and a chain 80 from a sprocket 81 fixed to the shaft 41 so that the entire drive of the working parts is from the power takeoff of the tractor. Additional guides 82 and 83 may be provided at the opposite sides of the conveyor, such guides being supported by brackets 84 attached to the angle members 12 and 13 and the lower ends of the guides 82 and 83 are attached directly to the angle side members 12 and 13.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A combined peanut digger and shaker comprising a frame including a three-point hitch for attachment to a tractor, an endless conveyor carried by said frame, a pair of correspondingly spaced sprockets one at each side of said frame, endless chains about each pair of sprockets, spaced cross bars attached along the lengths of said chains, spaced prongs carried by said cross bars, striker bar means across and of a length substantially equal to the width of the conveyor and mounted in association with said conveyor to move between the cross bars thereof and to strike the vines carried by the conveyor to impart a jarring blow thereto, a pair of angularly disposed plow blades supported below the forward portion of said frame and adapted to sever the tap roots of the peanuts when the machine is operated, and means for attaching the machine to a tractor in a manner that it can be both pulled and the conveyor driven by the tractor.

2. A combined peanut digger and shaker comprising a frame, means for attaching said frame to a tractor, angularly disposed plow blades mounted beneath said frame in a manner to sever the tap roots of peanuts in a plurality of rows and for unearthing the peanut vines with the peanuts attached, means for guiding the unearthed vines with the peanuts attached into a narrow strip, conveyor means for picking up the vines with the peanuts attached and carrying them up an incline and discharging them rearwardly from the machine, and striker bar means across and of a length substantially equal to the width of said conveyor means and coordinated to the movement of the conveyor means to move transversely of the latter to strike and shake peanut vines as they pass over the conveyor, said striker bar means being located adjacent one end of said conveyor means.

3. A combined peanut digger and shaker comprising plow means for severing the tap roots of peanuts along a row and for unearthing the peanuts with the vines, conveyor means for picking up the vines with the peanuts attached and moving them up an incline and discharging the same, and auxiliary transversely disposed striker mechanism across and of a length substantially equal to the width of said conveyor means and coordinated with the movement of the conveyor means to move transversely of the latter in a manner to strike and impart sudden movement to the peanut vines.

4. A combined peanut digger and shaker comprising plow means for severing the tap roots of peanuts along a row for unearthing the peanuts with the vines, conveyor means for picking up the vines with the peanuts attached and moving them up an incline and discharging the same, and auxiliary transversely disposed striker mechanism across and of a length substantially equal to the width of said conveyor means and coordinated with the movement of the conveyor means to move transversely of the latter in a manner to strike and impart sudden movement to the peanut vines, said striker mechanism being located adjacent the lower and upper ends of the conveyor means.

5. A combined peanut digger and shaker comprising plow means for severing the tap roots of peanuts along a row and for unearthing the peanuts with the vines, conveyor means for picking up the vines with the peanuts attached and moving them up an incline and discharging the same, and auxiliary transversely disposed striker mechanism across and of a length substantially equal to the width of said conveying means and coordinated with the movement of the conveyor means to move transversely of the latter in a manner to strike and impart sudden movement to the peanut vines, said striker mechanism being located adjacent one end of the conveyor means.

6. The structure of claim 3 and further striker mechanism for imparting a jarring blow to the vines as they are discharged from the conveyor means.

7. The structure of claim 3 and means for attaching said digger and shaker to a tractor and for driving said conveyor means and striker mechanism from the power takeoff of said tractor.

8. A combined peanut digger and shaker comprising a frame, means for attaching said frame to a tractor, angularly disposed plow blades mounted beneath said frame in a manner to sever the tap roots of peanuts in a plurality of rows and for unearthing the peanut vines with the peanuts attached, means for guiding the unearthed vines with the peanuts attached into a narrow strip, conveyor means for picking up the vines with peanuts attached and carrying them up an incline and discharging them rearwardly from the machine, and one or more striker bar means across and of a length substantially equal to the width of said conveyor means and coordinated to the movement of the conveyor means to move transversely of the latter to strike and shake peanut vines as they pass over the conveyor means, said striker bar means being located adjacent one end of said conveyor means, and further striker mechanism for shaking the vines after they pass over the conveyor means.

9. A combined peanut digger and shaker comprising a frame, means for attaching said frame to a tractor, angularly disposed plow blades mounted beneath said frame in a manner to sever the tap roots of peanuts in a plurality of rows and for unearthing the peanut vines with the peanuts attached, means for guiding the unearthed vines with the peanuts attached into a narrow strip, conveyor means for picking up the vines with peanuts attached and carrying them up an incline and discharging them rearwardly from the machine, and one or more striker bar means across and of a length substantially equal to the width of said conveyor means and coordinated to the movement of the conveyor means to move transversely of the latter to strike and shake peanut vines as they pass over the conveyor means, said striker bar means being located adjacent one end of said conveyor means, further striker mechanism for shaking the vines after they pass over the conveyor means, and means for driving said conveyor means and said striker mechanism from the power takeoff of a tractor.

References Cited in the file of this patent

UNITED STATES PATENTS

| | | |
|---|---|---|
| 853,601 | Schreiber | May 14, 1907 |
| 956,027 | Barnum | Apr. 26, 1910 |
| 2,562,569 | Carter et al. | July 31, 1951 |
| 2,669,820 | Falkner | Feb. 23, 1954 |